United States Patent Office 2,776,270
Patented Jan. 1, 1957

2,776,270

MIXTURES COMPRISING ACRYLONITRILE POLYMERS WITH POLYACRYLONITRILE

Harry W. Coover, Jr., and Joseph B. Dickey, Kingsport, Tenn., assignors to Eastman Kodak Company, Rochester, N. Y., a corporation of New Jersey No Drawing. Application October 21, 1952, Serial No. 316,054

18 Claims. (Cl. 260—32.6)

This invention relates to composite resinous compositions comprising a mixture of acrylonitrile polymers and polyacrylonitrile.

This application is a continuation-in-part of our copending application Serial No. 164,854, filed May 27, 1950 of H. W. Coover, Jr. and Joseph B. Dickey (now U. S. Patent 2,649,434, dated August 18, 1953).

It is known that polyacrylonitrile fibers can be spun which have excellent physical properties such as high strength, high sticking temperatures and good resistance to shrinkage at elevated temperatures. However, such fibers show certain disadvantageous properties which severely limit their commercial use such as low moisture absorption and more especially poor dyeability with most available dyes of the cellulose acetate, direct cotton, acid wool and vat type of dyes. For a great many textile purposes, improved dyeability of polyacrylonitrile fibers or fibers produced from polymers containing a high percentage of acrylonitrile would be highly desirable.

It is further known that greatly increased moisture absorption and dyeability of acrylonitrile fibers can be obtained by copolymerizing acrylonitrile with certain other unsaturated compounds whose polymers are shown to have good affinity for various dyes. While this procedure does give polymeric products having improved dyeability, a serious drawback arises in certain instances in that the fiber produced show a materially lower softening point, thus limiting their practical uses. Another procedure employed for the purpose of increasing dye affinity for polyacrylonitrile has been to mix the polyacrylonitrile, before spinning, with other film-forming materials which are known to be readily dyeable. However, it has been well established that acrylonitrile polymers are incompatible with most other polymeric materials. Out of many hundreds of synthetic polymers that have been tested, only a relatively small number of them have been found sufficiently compatible. For example, it can be demonstrated that mixtures of polyacrylonitrile with polyvinyl acetate, when dissolved in N,N'-dimethyl formamide in proportions varying from 15 to 50 percent by weight of the polyvinyl acetate and from 85 to 50 percent by weight of the polyacrylonitrile form grainy dopes which separate on standing into two liquid layers, and that fibers formed from such mixtures show segmentation into their individual components along their horizontal axes.

We have now found that stable, homogeneous solutions comprising two different acrylonitrile polymers which do not separate into distinct layers on standing, and from which fibers of good dyeability and excellent physical properties can be spun, can be obtained by dissolving in acrylonitrile solvents, individually or in intimate admixture, polyacrylonitrile and an acrylonitrile polymer prepared by homopolymerizing acrylonitrile in the presence of a non-isolated or "live" polymer, i. e., one not isolated from its polymerization mixture, such as vinyl esters, acrylates, acrylamides, citraconamides, itaconamides and their N-substituted derivatives.

It is, accordingly, an object of our invention to provide composite resinous compositions comprising certain acrylonitrile polymers intimately admixed with polyacrylonitrile. Another object is to provide a process for preparing these compositions. A further object is to provide homogeneous and stable solutions of the compositions. A still further object is to provide fibers prepared therefrom. Other objects will become apparent hereinafter.

In accordance with our invention, we prepare the composite resinous compositions of the invention by intimately mixing or by dissolving in suitable acrylonitrile polymer solvents such as dimethyl formamide, dimethyl acetamide, gamma-butyrolactone, ethylene carbonate, ethylene cyanohydrin, etc., in any individual order or in intimate admixture, from 5 to 95 parts by weight of polyacrylonitrile and from 95 to 5 parts by weight of an acrylonitrile polymer prepared by homopolymerizing from 5 to 95 percent by weight of acrylonitrile in the presence of from 95 to 5 percent by weight of a preformed "live" modifying homopolymer. The preformed "live" homopolymer is always polymerized until substantially none of its monomer remains in the polymerization mixture, then the acrylonitrile monomer is added thereto and the polymerization continued. However, all of the added acrylonitrile need not necessarily be completely polymerized, since satisfactory products are also obtained where the acrylonitrile polymerization is carried out to the extent that 90 percent or more of the acrylonitrile is polymerized. The solutions or dopes obtained in the above-mentioned solvents are clear and homogeneous and do not separate into two layers on standing or during spinning operations. Fibers can be spun from such solutions (dopes) by either the wet or dry spinning methods. The concentration of the polymers in the solvent can vary widely from very low (less than 1%) to much higher concentrations, but for efficient operations the concentration is advantageously from 5–20 percent. The dopes are stable over the usual temperature range of operations for spinning.

The preformed polymers which are useful in practicing our invention can be prepared by polymerizing monomers containing ethenoid unsaturation according to methods well known to the art. As ethenoid compounds we have found that acrylamides, acrylic esters, citraconamides, itaconamides, and vinyl esters provide compositions showing especially useful properties. The acrylamides have been found to be especially advantageous when used according to our invention.

The acrylamides which can be advantageously used in our invention comprise those represented by the following general formula:

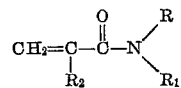

wherein R and $R_1$ each represents a hydrogen atom or alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4), and $R_2$ represents a hydrogen atom or a methyl group. Typical acrylamides include acrylamide, N-methylacrylamide, N-ethylacrylamide, N-isopropylacrylamide, N-n-butylacrylamide, methacrylamide, N-methylmethacrylamide, N-ethylmethacrylamide, N-isopropylmethacrylamide, N,N-dimethylacrylamide, N,N-diethylacrylamide, N,N-dimethylmethacrylamide, etc.

As acrylic esters, we can advantageously use those represented by the following general formula:

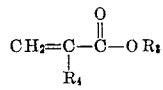

wherein $R_3$ represents an alkyl group, such as methyl, ethyl, n-propyl, isopropyl, n-butyl, isobutyl, etc groups (e. g. an alkyl group of the formula $C_nH_{2n+1}$ wherein $n$ represents a positive integer from 1 to 4), and $R_4$ represents a hydrogen atom, a methyl group, an acylamino group wherein the acyl group is the acyl group of a saturated aliphatic carboxylic acid containing from 2 to 4 carbon atoms, such as acetyl, propionyl, butyryl, isobutyryl, etc. groups, or a carbalkoxylamino group wherein the alkoxyl group contains from 1 to 4 carbon atoms such as methyl, ethyl, n-propyl, isopropyl, n-butyl, isobutyl, etc. groups. Typical esters wherein $R_4$ represents a hydrogen atom or a methyl group include methyl acrylate, ethyl acrylate, n-butyl acrylate, isobutyl acrylate, methyl methacrylate, ethyl methacrylate, n-propyl methacrylate, isopropyl methacrylate, n-butyl methacrylate, isobutyl methacrylate, etc. Typical esters wherein $R_4$ represents an acylamino group include, for example, methyl α-acetaminoacrylate, ethyl α-acetaminoacrylate, n-propyl α-acetaminoacrylate, isopropyl α-acetaminoacrylate n-butyl α-acetaminoacrylate, methyl α-propionaminoacrylate, ethyl α-propionaminoacrylate, n-butyl α-propionaminoacrylate, methyl α-n-butyraminoacrylate, ethyl α-n-butyraminoacrylate, isobutyl α-n-butyraminoacrylate, methyl α-isobutyraminoacrylate, ethyl α-isobutyraminoacrylate, n-propyl α-isobutyraminoacrylate, isobutyl α-isobutyraminoacrylate, etc. The acrylic esters wherein $R_4$ represents an acylamino group can be prepared according to the general method described in the copending application Serial No. 87,356, filed April 13, 1949, of H. W. Coover, Jr. and Joseph B. Dickey (now U. S. Patent 2,548,518, dated April 10, 1951). The process described in that application comprises reacting an alkali metal salt of an α-acylaminoacrylic ester with a dialkyl sulfate. The alkali metals useful for this process comprise those set forth in Serial No. 87,356 and also the alkali metal salts of the α-acylaminoacrylic esters described in the copending application Serial No. 132,216, filed December 9, 1949, of H. W. Coover, Jr. and Joseph B. Dickey (now U. S. Patent 2,622,074, dated December 16, 1952).

The acrylic esters wherein $R_4$ represents a carbalkoxylamino group can be prepared according to the method described in application Serial No. 132,217, filed December 9, 1949, of Joseph B. Dickey and H. W. Coover, Jr. (now U. S. Patent 2,563,776, dated August 7, 1951). Typical esters wherein $R_4$ represents a carbalkoxylamino group include methyl α-carbomethoxyaminoacrylate, ethyl α-carbomethoxyaminoacrylate, isobutyl α-carbomethoxyaminoacrylate, methyl α-carbethoxyaminoacrylate, n-propyl α-carbethoxyaminoacrylate, isobutyl α-carbethoxyaminominoacrylate, methyl α-carbopropoxyaminoacrylate, ethyl α-carbopropoxyaminoacrylate, isopropyl α-carbopropoxyaminoacrylate, n-butyl α-carbopropoxyaminoacrylate, methyl α-carbisopropoxyaminoacrylate, isobutyl α-carbisopropoxyaminoacrylate, methyl α-carbobutoxyaminoacrylate, n-propyl α-carbobutoxyaminoacrylate, methyl α-carbisobutoxyaminoacrylate, ethyl α-carbisobutoxyaminoacrylate, n-butyl α-carbisobutoxyaminoacrylate, etc.

As itaconamides, we can advantageously use those represented by the following general formula:

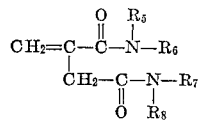

wherein $R_5$, $R_6$, $R_7$, and $R_8$ each represents a hydrogen atom, a methyl group, an ethyl group, etc. Typical itaconamides include itaconamide, N-methyl itaconamide, N-ethyl itaconamide, N,N'-dimethyl itaconamide, N,N'-dimethyl itaconamide, etc.

As citraconamides, we can advantageously use those represented by the following general formula:

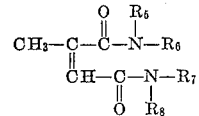

wherein $R_5$, $R_6$, $R_7$, and $R_8$ have the values given above. Typical citraconamides include citraconamide, N-methyl citraconamide, N-ethyl citraconamide, N,N'-dimethyl citraconamide, N,N'-diethyl citraconamide, etc.

As vinyl esters, we can advantageously employ those represented by the following general formula:

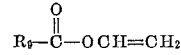

wherein $R_9$ represents a hydrogen atom or an alkyl group, such as methyl, ethyl, n-propyl, isopropyl, etc. groups (e. g. an alkyl group containing from 1 to 3 carbon atoms).

The polymerization can be accelerated by the use of a well-known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal ammonium persulfate, etc. Other catalysts such as the ketazines, azines, etc. can be used. The quantity of catalyst used can be varied, depending on the monomer, amount of diluent, etc. Sufficient catalyst can be used to homopolymerize the ethenoid monomer selected from those represented by the above general formulas and the monomeric acrylonitrile, or an amount of catalyst sufficient to polymerize only the ethenoid monomer can be used, and additional catalyst can be added with the acrylonitrile monomer to complete the polymerization. The catalyst added along with acrylonitrile may be the same catalyst that was used to polymerize the other ethenoid monomer. We have found that it is especially advantageous to use an amount of catalyst sufficient to polymerize only the first monomer, and then upon addition of the acrylonitrile to add a further amount of catalyst at that time. This procedure provides a readier means for regulating the molecular weight distribution of the polymer composition.

The temperature at which the process of our invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers (e. g. aryloxy polyalkylene ether sulfonates, such as Triton 720), etc.

The polymerization can be carried out in the presence of chain regulators, such as hexyl, octyl, lauryl, dodecyl, myristyl mercaptans, etc., which impart improved solubility properties to the polymer composition. If desired, reducing agent such as alkali metal bisulfites (e. g. potassium, sodium, etc. bisulfites) can be added to reduce the time required for the polymerization to be effected.

The following examples will serve to illustrate further the manner whereby we practice our invention.

*Example 1*

9.7 g. of vinyl acetate were suspended in 100 cc. of distilled water along with 0.1 g. of ammonium persulfate, 0.1 g. of sodium bisulfite, and 1.0 g. of an aryloxy polyalkylene sulfonated ether type of emulsifying agent. The resulting emulsion was allowed to polymerize for 16 hours at 50° C. and then cooled down to room temperature. A solution of 0.5 g. of acrylonitrile, 0.01 g. of ammonium pesulfate, and 0.01 g. of sodium bisulfite in 10 cc. of water was added and the polymerization completed by tumbling at 50° C. for 8 hours. The emulsion was broken by the addition of a concentrated salt solution, and the precipitated polymer was filtered, washed, and dried. On analysis, the polymer composition was found to contain 95 percent by weight of vinyl acetate.

Fibers obtained from a mechanical mixture containing 30 percent by weight of the polymer obtained and 70 percent by weight of polyacrylonitrile, by extruding a solution of the mixture in N,N-dimethylformamide into a precipitating bath, had a tenacity of 3.4 g. per denier, an extensibility of 20 percent, a sticking temperature of 195° C., and shrank 9 percent in boiling water.

*Example 2*

2.0 g. of N-methylmethacrylamide were dissolved in 80 cc. of water along with 0.2 g. of potassium persulfate and 0.02 g. of sodium bisulfite. The solution was allowed to polymerize for sixteen hours at 25° C. There were then added 8.0 g. of acrylonitrile, 0.1 g. of potassium persulfate and 0.1 g. of sodium bisulfite, and the mixture was allowed to polymerize for eight hours at 25° C. The polymer product was then separated from the reaction mixture by filtration, yielding 9.2 g. On analysis the polymer was found to contain 21 percent by weight of N-methylmethacrylamide.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 50 parts polyacrylonitrile and 50 parts of the above polymer and extruding the solution into a precipitating bath, had a tenacity of 3.1 g. per denier, an extensibility of 20 percent, a sticking temperature of 210° C., and shrank only 6 percent in boiling water.

*Example 3*

2.0 g. of N-methylacrylamide were dissolved in 100 cc. of water containing 0.04 g. of potassium persulfate. The solution was heated at 50° C. for sixteeen hours, and the solution cooled to room temperature. There were then added 8.0 g. of acrylonitrile, 0.1 g. of potassium persulfate and 0.1 g. of sodium bisulfite. The reaction mixture was then allowed to stand at 25° C. for sixteen hours. The precipitated polymer weighed 8.5 g. and contained 20 percent by weight of N-methylacrylamide.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 5 parts polyacrylonitrile and 95 parts of the above polymer, and extruding the solution into a precipitating bath, had a tenacity of 3.3 g. per denier, an extensibility of 19 percent and a sticking temperature of 225° C.

*Example 4*

2.0 g. of vinyl acetate were suspended in 18 cc. of water along with 0.02 g. of ammonium persulfate, 0.02 g. of sodium bisulfite, and 1.1 g. of an aryloxy polyalkylene sulfonated ether type of emulsifying agent. The resulting emulsion was allowed to polymerize for sixteen hours at 50° C., then cooled down to room temperature and added to a dispersion containing 8.0 g. of acrylonitrile, 1.0 g. of ammonium persulfate, 0.1 g. of sodium bisulfite, and 2.0 g. of an aryloxy polyalkylene sulfonated ether (Triton 720) in 50 cc. of water. After tumbling the reaction mixture at 50° C. for two hours, the polymer product was precipitated by the addition of an aqueous solution of sodium chloride to give 9.7 g. of polymer product containing 20 percent by weight of vinyl acetate.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 10 parts polyacrylonitrile and 90 parts of the above polymer and extruding the solution into a precipitating bath, had a tenacity of 3.2 g. per denier, an extensibility of 21 percent and a sticking temperature of 210° C.

*Example 5*

2.0 g. of methacrylamide were dissolved in 50 cc. of water containing 0.05 g. of ammonium persulfate. The resulting solution was heated at 50° C. for sixteen hours, cooled to room temperature, and a mixture containing 8.0 g. of acrylonitrile, 0.1 g. of ammonium persulfate, and 0.1 g. of sodium bisulfite was added. The reaction mixture was allowed to stand at 25° C. for sixteen hours. The precipitated polymer weighed 9.3 g. and contained 19 percent by weight of methacrylamide by analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 20 parts polyacrylonitrile and 80 parts of the above polymer and extruding the solution into a precipitating bath, had a tenacity of 3 g. per denier, an extensibility of 21 percent and a sticking temperature of 215° C.

*Example 6*

4.0 g. of vinyl acetate were suspended in 40 cc. of water containing 0.04 g. of ammonium persulfate, 0.04 g. of sodium bisulfite, and 2.2 g. of an aryloxy polyalkylene sulfonated ether type of emulsifying agent. The resulting emulsion was allowed to polymerize for sixteen hours at 50° C., then cooled to room temperature and a dispersion containing 6.0 g. of acrylonitrile, 0.1 g. of potassium persulfate, 0.1 g. of sodium bisulfite, and 2.0 g. of an aryloxy polyalkylene sulfonated ether type of emulsifying agent in 50 cc. of water was added. The reaction mixture was tumbled for two hours at 50° C. There were thus obtained 9.4 g. of polymer product containing 43 percent by weight of vinyl acetate.

The polymers can be mixed with polyacrylonitrile in all proportions and dissolved to give stable solutions which do not separate into distinct layers on standing and from which fibers and films of homogeneous character can be spun, extruded or cast.

*Example 7*

8.0 g. of vinyl acetate were suspended in 80 cc. of water containing 0.1 g. of ammonium persulfate, 0.1 g. of sodium bisulfite, and 5.0 g. of an aryloxy polyalkylene sulfonated ether type of emulsifying agent. The emulsion was allowed to polymerize for 16 hours at 50° C., at the end of which time polymerization seemed to be complete. The reaction mixture was then cooled and added to a dispersion containing 2.0 g. of acrylonitrile, 0.05 g. of ammonium persulfate, 0.05 g. of sodium bisulfite and 1.0 g. of an aryloxy polyalkylene sulfonated ether (Triton 720) in 30 cc. of water. After tumbling the reaction mixture for 4 hours at 50° C. there were obtained 9.7 g. of polymer containing 83 percent by weight of vinyl acetate.

The polymers can be mixed with polyacrylonitrile in all proportions and dissolved to give stable solutions which do not separate into distinct layers on standing and from which fibers and films of homogeneous character can be spun, extruded or cast.

*Example 8*

2.0 g. of citraconamide, 0.05 g. of potassium persulfate and 1 cc. of 7-ethyl-2-methylundecan-4-sulfonic acid sodium salt (Tergitol No. 4) were added to 30 cc. of water. The resulting emulsion was then tumbled at 50° C. for 12 hours, at the end of which time 8.0 g. of acrylonitrile and 0.1 g. of potassium persulfate in 70 cc. of water were added. The reaction mixture was then tumbled for an additional 12 hours at 50° C. The resulting polymer was obtained in an 88 percent yield and contained 18 percent by weight of citraconamide by analysis. It was soluble in either N,N-dimethylformamide or N,N-dimethylacetamide.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 70 parts polyacrylonitrile and 30 parts of the above polymer and extruding the solution into a precipitating bath, had a tenacity of 3.3 g. per denier, an extensibility of 22 percent and a sticking temperature of 220° C.

*Example 9*

3.0 g. of itaconamide, 0.1 g. of ammonium persulfate, 0.1 g. of sodium bisulfite, and 1.0 g. of an aryloxy polyalkylene sulfonated ether type of emulsifying agent were added to 50 cc. of distilled water. The resulting emulsion was then heated for 12 hours at 45° C. with tumbling. A solution of 17.0 g. of acrylonitrile, 0.2 g. of ammonium persulfate and 0.2 g. of sodium bisulfite in 50 cc. of distilled water was then added. The reaction mixture was then heated for an additional 8 hours at 35° C. The resulting polymer was obtained in an 89 percent yield and contained 14 percent by weight of itaconamide by analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 60 parts polyacrylonitrile and 40 parts of the above polymer and extruding the solution into a precipitating bath, had a tenacity of 3.4 g. per denier, an extensibility of 22 percent and a sticking temperature of 215° C.

*Example 10*

9.5 g. of N-methylacrylamide were dissolved in 50 cc. of water containing .1 g. of ammonium persulfate and .1 g. of sodium bisulfite. The resulting solution was tumbled for 8 hours at 35° C. and after cooling to room temperature, .5 g. of acrylonitrile and .05 g. of sodium bisulfite were added and the polymerization was completed by heating at 35° C. for an additional six hours. The polymer was isolated by pouring the resulting emulsion into acetone. The precipitated polymer was filtered, washed with acetone, and dried.

The polymers can be mixed with polyacrylonitrile in all proportions and dissolved to give stable solutions which do not separate into distinct layers on standing and from which fibers and films of homogeneous character can be spun, extruded or cast.

*Example 11*

9 g. of methylacrylate were suspended in 70 cc. of water containing 0.1 g. of 90 percent hydrogen peroxide and 1 g. of an aryloxy polyalkylene sulfonated ether type of emulsifying agent. The resulting emulsion was tumbled for 14 hours at 50° C. and after cooling to room temperature, 1 g. of acrylonitrile and 0.05 g. of 90 percent hydrogen peroxide solution were added. After tumbling for an additional 12 hours at 50° C., the polymerization was substantially complete. The resulting polymer contained 9 percent methylacrylate by analysis and was soluble in such solvents as N,N-dimethylformamide and N,N-dimethylacetamide, etc.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 90 parts polyacrylonitrile and 10 parts of the above polymer and extruding the solution into a precipitating bath, had a tenacity of 3.1 g. per denier, an extensibility of 20 percent and a sticking temperature of 205° C.

*Example 12*

20 g. of vinyl acetate were suspended in 150 cc. of water along with 0.2 g. of ammonium persulfate, 0.2 g. of sodium bisulfite, and 4 cc. of 7-ethyl-2-methylundecan-4-sulfonic acid sodium salt (Tergitol No. 4). The resulting emulsion was heated for 16 hours at 50° C., and after cooling to room temperature, there were added 10 g. of acrylonitrile, 0.1 g. of ammonium persulfate, and 0.1 g. of sodium bisulfite. The reaction mixture was heated for an additional 12 hours at 35° C. There was thus obtained a polymer in 91 percent yield which contained 29 percent acrylonitrile by analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 60 parts polyacrylonitrile and 40 parts of the above polymer and extruding the solution into a precipitating bath, had a tenacity of 2.9 g. per denier, an extensibility of 23 percent and a sticking temperature of 200° C.

*Example 13*

10 g. of N-methylacrylamide were dissolved in 50 cc. of water containing 0.1 g. of potassium persulfate and 0.1 g. of sodium bisulfite. The solution was then heated for 12 hours at 35° C., at the end of which time polymerization seemed to be complete. There were then added 2.0 g. of acrylonitrile, 0.01 g. of potassium persulfate and 0.01 g. of sodium bisulfite, and the reaction mixture was heated for an additional 8 hours at 35° C. The polymer was precipitated by the addition of acetone and was obtained in an 86 percent yield. It contained 16 percent acrylonitrile by analysis.

Fibers obtained from a mixture of the polymer obtained in the above example and polyacrylonitrile contained 20 percent N-methylacrylamide and had a tenacity of 3.2 g. per denier, an extensibility of 21 percent, a sticking temperature of 200° C., and shrank 10 percent in boiling water. The fibers had an excellent affinity for acetate, direct vat, and acid dyes.

The polymers can be mixed with polyacrylonitrile in all proportions and dissolved to give stable solutions which do not separate into distinct layers on standing and from

Example 14

12 g. of methyl α-acetaminoacrylate were dissolved in 50 cc. of distilled water containing 0.1 g. of ammonium persulfate. The reaction mixture was then heated for 16 hours at 35° C., at the end of which time polymerization appeared to be complete. There were added to the cooled mixture 2.0 g. of acrylonitrile, 0.02 g. of ammonium persulfate, and 0.02 g. of sodium bisulfite. The reaction mixture was then heated for an additional 12 hours at 35° C., and the resulting polymer was coagulated by the addition of acetone. The polymer contained 14 percent acrylonitrile by analysis.

Fibers obtained from a mixture of the polymer obtained in the above example and polyacrylonitrile contained 30 percent methyl α-acetaminoacrylate and had a tenacity of 3.5 g. per denier, a sticking temperature of 225° C., 5.3 percent moisture absorption at 65 percent relative humidity, and shrank 11 percent in boiling water. The fibers had excellent affinity for acetate, direct, vat, and acid dyes.

Example 15

1.0 g. of N-isopropylmethacrylamide was dissolved in 50 cc. of acetonitrile containing 0.05 g. of benzoyl peroxide. The solution was heated for 16 hours at 65° C., and after cooling to room temperature, there were added 9.0 g. of acrylonitrile and 0.1 g. of benzoyl peroxide. The reaction mixture was then heated for an additional 16 hours at 65° C. The resulting polymer was obtained in an 85 percent yield and contained 9 percent N-isopropylmethacrylamide.

The polymers can be mixed with polyacrylonitrile in all proportions and dissolved to give stable solutions which do not separate into distinct layers on standing and from which fibers and films of homogeneous character can be spun, extruded or cast.

Example 16

3.0 g. of methyl α-carbethoxyaminoacrylate were dissolved in 70 cc. of water containing 0.05 g. of potassium persulfate and 0.05 g. of sodium bisulfite. The mixture was then held for 8 hours at room temperature at the end of which time polymerization appeared to be complete. There were then added 7.0 g. of acrylonitrile, 0.1 g. of potassium persulfate, and 0.1 g. of sodium bisulfite, and the reaction mixture was allowed to stand for an additional 8 hours. The polymer was obtained in an 85 percent yield and contained 32 percent methyl α-carbethoxyaminoacrylate by analysis.

The polymers can be mixed with polyacrylonitrile in all proportions and dissolved to give stable solutions which do not separate into distinct layers on standing and from which fibers and films of homogeneous character can be spun, extruded, or cast.

The mixtures of the invention which have a combined acrylonitrile content by weight of from 60 to 95 percent, the remainder of the composite composition being made up of other of the mentioned components of the invention, are particularly useful for preparing fiber-forming materials. However the above compositions, together with the composite compositions which have a combined acrylonitrile content by weight of from 5 to 60 percent, the remainder of the composite composition in each case being made up of other of the mentioned components of the invention, can all be made up into solutions or dopes in the mentioned solvents, with or without fillers, pigments, dyes, plasticizers, etc., as desired, and the dopes coated on a smooth surface to give flexible and tough films and sheet materials which are useful for photographic film support and other purposes.

Other solvents which can be used for the preparation of fibers and coating compositions for the new polymer mixtures of our invention include ethylene carbamate, N-methyl-2-pyrrolidone, N,N-dimethylmethoxyacetamide, dimethyl cyanamide, N,N-dimethyl cyanoacetamide, N,N-dimethyl-β-cyanopropionamide, glycolonitrile (formaldehyde cyanohydrin), malononitrile, dimethylsulfoxide, dimethyl sulfone, tetramethylene sulfone, tetramethylene sulfoxide, N - formylpyrrolidine, N - formylmorpholine, N,N'-tetramethylene methanephosphonamide, and the like.

In addition to the above-described mixtures, we have found that the acrylonitrile polymers containing alkenyl carbonamides can also be mixed with each other or with other acrylonitrile copolymers containing at least 85 percent by weight of acrylonitrile and 15 percent by weight of another monoethylenically unsaturated, polymerizable compound containing a —CH=C< group or a CH$_2$=C< group, to give generally similar stable homogeneous solutions.

What we claim is:

1. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of monomer selected from the group consisting of those represented by the following general formulas:

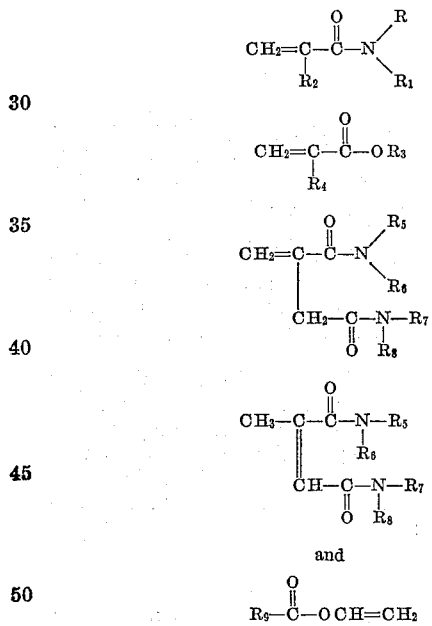

and $$R_9-\overset{O}{\underset{\|}{C}}-O\,CH=CH_2$$

wherein R and R$_1$ each represents a member selected from the group consisting of a hydrogen atom and an alkyl group containing from 1 to 4 carbon atoms, R$_2$ represents a member selected from the group consisting of a hydrogen atom and a methyl group, R$_3$ represents an alkyl group containing from 1 to 4 carbon atoms, R$_4$ represents a member selected from the group consisting of a hydrogen atom, a methyl group, an acylamino group, wherein the acyl group is the acyl group of a saturated aliphatic carboxylic acid containing from 2 to 4 carbon atoms and a carbalkoxylamino group wherein the alkoxyl group contains from 1 to 4 carbon atoms, R$_5$, R$_6$, R$_7$ and R$_8$ each represents a member selected from the group consisting of a hydrogen atom, a methyl group and an ethyl group, and R$_9$ represents a member selected from the group consisting of a hydrogen atom and an alkyl group containing from 1 to 3 carbon atoms, until the monomer has substantially completely homopolymerized, adding to the polymerization reaction mixture containing said homopolymerized monomer from 5 to 95 percent by weight of acrylonitrile, based on the combined weights of the other monomer and acrylonitrile, and heating the reaction mixture until the acrylonitrile has substantially polymerized.

2. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of an acrylamide selected from those represented by the following general formula:

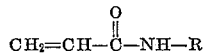

wherein R represents an alkyl group containing from 1 to 4 carbon atoms, until the monomer has substantially completely homopolymerized, adding to the polymerization reaction mixture containing said homopolymerized monomer from 5 to 95 percent by weight of acrylonitrile, based on the combined weights of the acrylamide and acrylonitrile, and heating the reaction mixture until the acrylonitrile has polymerized to yield a modified polymer containing 5 to 95 percent by weight of acrylonitrile.

3. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of a methacrylamide selected from those represented by the following general formula:

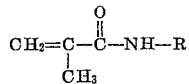

wherein R represents an alkyl group containing from 1 to 4 carbon atoms, until the monomer has substantially completely homopolymerized, adding to the polymerization reaction mixture containing said homopolymerized monomer from 5 to 95 percent by weight of acrylonitrile, based on the combined weights of the methacrylamide and acrylonitrile, and heating the reaction mixture until the acrylonitrile has polymerized to yield a modified polymer containing 5 to 95 percent by weight of acrylonitrile.

4. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of a vinyl ester selected from those represented by the following general formula:

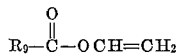

wherein $R_9$ represents an alkyl group containing from 1 to 3 carbon atoms, until the monomer has substantially completely homopolymerized, adding to the polymerization reaction mixture containing said homopolymerized monomer from 5 to 95 percent by weight of acrylonitrile, based on the combined weights of vinyl ester and acrylonitrile, and heating the reaction mixture until the acrylonitrile has polymerized to yield a modified polymer containing 5 to 95 percent by weight of acrylonitrile.

5. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of N-methylacrylamide until homopolymerization is substantially complete, adding to the polymerization reaction mixture containing the homopolymerized monomer from 5 to 95 percent by weight of acrylonitrile, based on the combined weights of N-methylacrylamide and acrylonitrile, and heating the reaction mixture until the acrylonitrile has substantially polymerized.

6. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of N-isopropylmethacrylamide until homopolymerization is substantially complete, adding to the polymerization reaction mixture containing the homopolymerized monomer from 5 to 95 percent by weight of acrylonitrile, based on the combined weights of N-isopropylmethacrylamide and acrylonitrile, and heating the reaction mixture until the acrylonitrile has substantially polymerized.

7. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of N,N-dimethylacrylamide untile homopolymerization is substantially complete, adding to the polymerization reaction mixture containing the homopolymerized monomer from 5 to 95 percent by weight of acrylonitrile, based on the combined weights of N,N-dimethylacrylamide and acrylonitrile, and heating the reaction mixture until the acrylonitrile has substantially polymerized.

8. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of methacrylamide until homopolymerization is substantially complete, adding to the polymerization reaction mixture containing the homopolymerized monomer from 5 to 95 percent by weight of acrylonitrile, based on the combined weights of methacrylamide and acrylonitrile, and heating the reaction mixture until the acrylonitrlie has substantially polymerized.

9. A resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of vinyl acetate until homopolymerization is substantially complete, adding to the polymerization mixture containing the homopolymerized monomer from 5 to 95 percent by weight of acrylonitrile, based on the combined weights of vinyl acetate and acrylonitrile, and heating the reaction mixture until the acrylonitrile has substantially polymerized.

10. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of a monomer selected from the group consisting of those represented by the following general formulas:

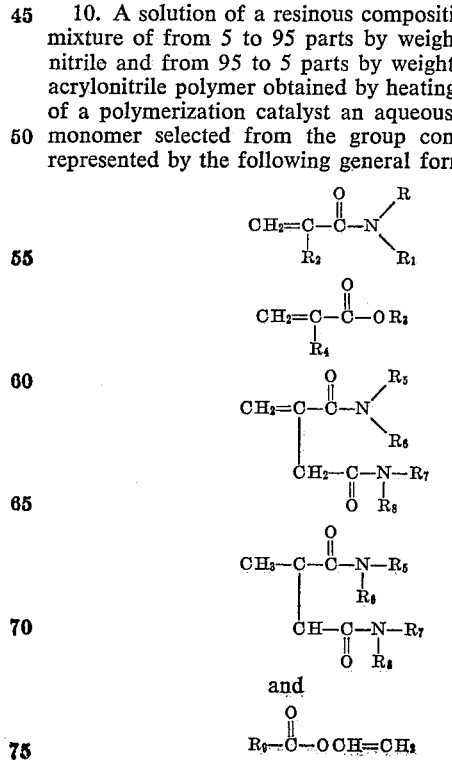

wherein R and $R_1$ each represents a member selected from the group consisting of a hydrogen atom and an alkyl group containing from 1 to 4 carbon atoms, $R_2$ represents a member selected from the group consisting of a hydrogen atom and a methyl group, $R_3$ represents an alkyl group containing from 1 to 4 carbon atoms, $R_4$ represents a member selected from the group consisting of a hydrogen atom, a methyl group, an acylamino group, wherein the acyl group is the acyl group of a saturated aliphatic carboxylic acid containing from 2 to 4 carbon atoms and a carbalkoxylamino group wherein the alkoxyl group contains from 1 to 4 carbon atoms, $R_5$, $R_6$, $R_7$ and $R_8$ each represents a member selected from the group consisting of a hydrogen atom, a methyl group and an ethyl group, and $R_9$ represents a member selected from the group consisting of a hydrogen atom and an alkyl group containing from 1 to 3 carbon atoms, until the monomer has substantially completely homopolymerized, adding to the polymerization reaction mixture containing said homopolymerized monomer from 5 to 95 percent by weight of acrylonitrile, based on the combined weights of the other monomer and acrylonitrile, and heating the reaction mixture until the acrylonitrile has polymerized to yield a product containing 5 to 95 percent by weight of acrylonitrile, in a solvent selected from the group consisting of dimethyl formamide, dimethyl acetamide, gamma-butyrolactone, ethylene carbonate and ethylene cyanohydrin.

11. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of an acrylamide selected from those represented by the following general formula:

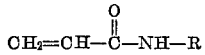

wherein R represents an alkyl group containing from 1 to 4 carbon atoms, until the monomer has substantially completely homopolymerized, adding to the polymerization mixture containing said homopolymerized monomer from 5 to 95 percent by weight of acrylonitrile, based on the combined weights of the acrylamide and acrylonitrile, and heating the reaction mixture until the acrylonitrile has substantially polymerized, in dimethyl formamide.

12. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of a methacrylamide selected from those represented by the following general formula:

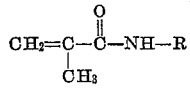

wherein R represents an alkyl group containing from 1 to 4 carbon atoms, until the monomer has substantially completely homopolymerized, adding to the polymerization reaction mixture containing said homopolymerized monomer from 5 to 95 percent by weight of acrylonitrile, based on the combined weights of the methacrylamide and acrylonitrile, and heating the reaction mixture until the acrylonitrile has substantially polymerized, in dimethyl formamide.

13. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of a vinyl ester selected from those represented by the following general formula:

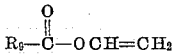

wherein $R_9$ represents an alkyl group containing from 1 to 3 carbon atoms, until the monomer has substantially completely homopolymerized, adding to the polymerization mixture containing said homopolymerized monomer from 5 to 95 percent by weight of acrylonitrile, based on the combined weights of vinyl ester and acrylonitrile, and heating the reaction mixture until the acrylonitrile has substantially polymerized, in dimethyl formamide.

14. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of N-methylacrylamide until homopolymerization is substantially complete, adding to the polymerization mixture containing the homopolymerized monomer from 5 to 95 percent by weight of acrylonitrile, based on the combined weights of N-methylacrylamide and acrylonitrile, and heating the reaction mixture until the acrylonitrile has substantially polymerized, in dimethyl formamide.

15. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of N-isopropylmethacrylamide until homopolymerization is substantially complete, adding to the polymerization mixture containing the homopolymerized monomer from 5 to 95 percent by weight of acrylonitrile, based on the combined weights of N-isopropylmethacrylamide and acrylonitrile, and heating the reaction mixture until the acrylonitrile has substantially polymerized, in dimethyl formamide.

16. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of N,N-dimethylacrylamide until homopolymerization is substantially complete, adding to the polymerization mixture containing the homopolymerized monomer from 5 to 95 percent by weight of acrylonitrile, based on the combined weights of N,N-dimethylacrylamide and acrylonitrile, and heating the reaction mixture until the acrylonitrile has substantially polymerized, in dimethyl formamide.

17. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of methacrylamide until homopolymerization is subtantially complete, adding to the polymerization mixture containing the homopolymerized monomer from 5 to 95 percent by weight of acrylonitrile, based on the combined weights of methacrylamide and acrylonitrile, and heating the reaction mixture until the acrylonitrile has substantially polymerized, in dimethyl formamide.

18. A solution of a resinous composition comprising a mixture of from 5 to 95 parts by weight of polyacrylonitrile and from 95 to 5 parts by weight of a preformed acrylonitrile polymer obtained by heating in the presence of a polymerization catalyst an aqueous dispersion of vinyl acetate until homopolymerization is substantially complete, adding to the polymerization mixture containing the homopolymerized monomer from 5 to 95 percent by weight of acrylonitrile, based on the combined weights of vinyl acetate and acrylonitrile, and heating the reaction mixture until the acrylonitrile has substantially polymerized, in dimethyl formamide.

(References on following page)

References Cited in the file of this patent

UNITED STATES PATENTS

| | | |
|---|---|---|
| 2,067,234 | Gordon et al | Jan. 12, 1937 |
| 2,123,599 | Fikentscher et al. | July 12, 1938 |
| 2,133,257 | Strain | Oct. 11, 1938 |
| 2,311,548 | Jacobson et al. | Feb. 16, 1943 |
| 2,425,192 | Kropa | Aug. 5, 1947 |
| 2,571,777 | Stanin et al. | Oct. 16, 1951 |
| 2,589,055 | Coover et al. | Mar. 11, 1952 |
| 2,620,324 | Coover et al. | Dec. 2, 1952 |
| 2,649,434 | Coover et al. | Aug. 18, 1953 |
| 2,657,191 | Coover et al. | Oct. 27, 1953 |
| 2,688,008 | Chaney et al. | Aug. 31, 1954 |